(12) United States Patent
Whitney et al.

(10) Patent No.: US 11,055,412 B2
(45) Date of Patent: Jul. 6, 2021

(54) METHOD AND SYSTEM FOR STAKE-BASED EVENT MANAGEMENT WITH LEDGERS

(71) Applicant: AT&T Intellectual Property I, L.P., Atlanta, GA (US)

(72) Inventors: Joshua Whitney, Richardson, TX (US); Martin Patrick McEnroe, Plano, TX (US); Eric Zavesky, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 378 days.

(21) Appl. No.: 16/227,580

(22) Filed: Dec. 20, 2018

(65) Prior Publication Data

US 2020/0202001 A1 Jun. 25, 2020

(51) Int. Cl.
*G06F 21/57* (2013.01)
*G06F 16/18* (2019.01)
*H04L 12/24* (2006.01)
*H04L 29/06* (2006.01)

(52) U.S. Cl.
CPC .......... *G06F 21/57* (2013.01); *G06F 16/1805* (2019.01); *H04L 41/064* (2013.01); *H04L 41/069* (2013.01); *H04L 63/20* (2013.01)

(58) Field of Classification Search
CPC ... G06F 21/57; G06F 16/1805; H04L 41/064; H04L 41/069; H04L 63/20
See application file for complete search history.

(56) References Cited

U.S. PATENT DOCUMENTS

| 9,703,986 | B1 | 7/2017 | Ashley et al. |
| 9,870,591 | B2 | 1/2018 | Shah |
| 9,928,290 | B2 | 3/2018 | Tiell |

(Continued)

FOREIGN PATENT DOCUMENTS

| WO | 2015085393 | 6/2015 |
| WO | 2017069874 | 4/2017 |

(Continued)

OTHER PUBLICATIONS

Dorri et al., Blockchain: A Distributed Solution to Automotive Security and Privacy, IEEE Communications Magazine, vol. 55, Issue 12, Available online at https://allguantor.at/blockchainbib/pdf/dorri2017blockchaindistributed.pdf, Dec. 2017, pp. 119-125.

(Continued)

Primary Examiner — Arvin Eskandarnia
(74) Attorney, Agent, or Firm — Amin, Turocy & Watson, LLP

(57) ABSTRACT

A trust-less system for sharing event information among autonomous nodes may include: a plurality of autonomous nodes, each of which creates an event related to a condition, a first ledger configured to collect and store a record of each event; a second ledger configured to store reputation information for the plurality of autonomous nodes; and a bookmaker module operable to determine a reward and a penalty for each event. The bookmaker module may be operable to modify the reputation information based on a status of the condition determined by subsequent events created by autonomous nodes where the subsequent events either validate or invalidate the condition.

20 Claims, 8 Drawing Sheets

(56) References Cited

U.S. PATENT DOCUMENTS

| | | | |
|---|---|---|---|
| 10,062,277 B2 | 8/2018 | Furuichi et al. | |
| 2013/0124272 A1* | 5/2013 | Hohti | G06Q 30/0231 |
| | | | 705/14.3 |
| 2015/0302400 A1 | 10/2015 | Metral | |
| 2017/0023945 A1* | 1/2017 | Cavalcanti | G08G 1/0116 |
| 2017/0140394 A1 | 5/2017 | Cao et al. | |
| 2017/0147808 A1 | 5/2017 | Kravitz | |
| 2017/0200321 A1* | 7/2017 | Hummel | G06Q 30/0611 |
| 2017/0243212 A1 | 8/2017 | Castinado et al. | |
| 2017/0270527 A1 | 9/2017 | Rampton | |
| 2017/0353311 A1 | 12/2017 | Schukai et al. | |
| 2018/0040007 A1 | 2/2018 | Lane et al. | |
| 2018/0041571 A1 | 2/2018 | Rogers et al. | |
| 2018/0062848 A1 | 3/2018 | Gorman | |
| 2018/0091596 A1 | 3/2018 | Alvarez et al. | |
| 2018/0123882 A1 | 5/2018 | Anderson et al. | |
| 2018/0130130 A1 | 5/2018 | Dechu et al. | |
| 2018/0157688 A1 | 6/2018 | Zessin et al. | |
| 2018/0240085 A1 | 8/2018 | Balachov et al. | |
| 2018/0247376 A1 | 8/2018 | Sharma et al. | |
| 2019/0132276 A1* | 5/2019 | Scheiber | H04L 67/12 |
| 2019/0220010 A1* | 7/2019 | Leonard | B60W 50/14 |
| 2019/0306177 A1* | 10/2019 | Kobayashi | H04L 63/1408 |
| 2020/0174471 A1* | 6/2020 | Du | G06N 3/084 |

FOREIGN PATENT DOCUMENTS

| | | |
|---|---|---|
| WO | 2017136956 | 8/2017 |
| WO | 2017145005 | 8/2017 |
| WO | 2017180382 | 10/2017 |

OTHER PUBLICATIONS

Lu et al., BARS: A Blockchain-Based Anonymous Reputation System for Trust Management in VANETs, 17th IEEE International Conference on Trust, Security and Privacy in Computing and Communications/12th IEEE International Conference on Big Data Science and Engineering, Available on at https://arxiv.org/ftp/arxiv/papers /1807/ 1807. 06159.pdf, Jul. 17, 2018, 6 pages.

Moinet et al., Blockchain Based Trust & Authentication for Decentralized Sensor Networks, Available online at https://arxiv.org/pdf/1706.01730.pdf, 2017, 6 pages.

Sharma et al., Block-VN: A Distributed Blockchain Based Vehicular Network Architecture in Smart City, Journal of Information Processing Systems, vol. 13, No. 1, Available online at https://pdfs.semanticscholar.org/cbe2/f7dd07d869dd1d0b2ba1cbc03b84dd695bb1.pdf, 2017, pp. 184-195.

* cited by examiner

| Car A |
|---|
| Reputation: 2000 |
| Action: Report pothole |
| Stake: $10 |
| Reward: 0.7% |
| Penalty: 0.2% |
| Timestamp: 6/8/18 1:00 AM |
| TTL: 24 hours |

217a — Car A
211 — Reputation: 2000
212 — Action: Report pothole
215 — Stake: $10
216 — Reward: 0.7%
214 — Penalty: 0.2%
213 — Timestamp: 6/8/18 1:00 AM

| Car B |
|---|
| Reputation: 2000 |
| Action: Validates pothole |
| Stake: $10 |
| Reward: 0.35% |
| Penalty: 0.1% |
| Timestamp: 6/8/18 4:00 AM |
| TTL: 24 hours |

227a — Car B
221 — Reputation: 2000
222 — Action: Validates pothole
225 — Stake: $10
226 — Reward: 0.35%
224 — Penalty: 0.1%
223 — Timestamp: 6/8/18 4:00 AM 210b

| Car A |
|---|
| Reputation: 2010 |
| Stake: $10 |
| Reward: 0.7% |
| Penalty: 0.2% |
| Timestamp: 6/8/18 1:00 AM |
| TTL: 24 hours |

217b — Car A
212 — Reputation: 2010
215 — Stake: $10
216 — Reward: 0.7%
214 — Penalty: 0.2%
213 — Timestamp: 6/8/18 1:00 AM 228 — Mitigation: Avoids pothole

METHOD AND SYSTEM FOR STAKE-BASED EVENT MANAGEMENT WITH LEDGERS

BACKGROUND

Unless otherwise indicated herein, the materials described in this section are not prior art to the claims in this application and are not admitted to be prior art by inclusion in this section.

As more devices monitor and contribute to autonomous environments, the security and trust of items populating these environments must be considered. This sensorium (i.e., the collection of sensors and data) can be examined specifically for complexity around autonomous vehicles, but the problem of security and trust exists for all interacting Internet-of-Things (IoT) and trust-less data consumers and non-repudiation of sensors. Finally, issues such as minor sensor reporting glitches, for example, a faulty sensor or a contribution with minor error, to major fraudulent contributions, for example, an enterprise actor or dishonest contributor that stops traffic by emulating a sinkhole, must be accommodated and defended against where possible.

SUMMARY

Systems and methods for stake-based events and identity security are provided.

According to various aspects there is provided a trust-less system for sharing event information among autonomous nodes. In some aspects, the trust-less system may include: a plurality of autonomous nodes. An autonomous node may be a sensor, and the sensor may be part of an autonomous vehicle. Each of the plurality of autonomous nodes may create an event related to a condition. The event may include event information including an indication of the condition, a stake indicating a degree of confidence that the condition is valid, and a time to live (TTL) for the event. The trust-less system may also include: a first ledger configured to collect and store a record of each event created by the plurality of autonomous nodes; a second ledger configured to store reputation information for the plurality of autonomous nodes; and a bookmaker module operable to determine a reward and a penalty for each event created by the plurality of autonomous nodes.

The bookmaker module may be operable to modify the reputation information for one or more of the plurality of autonomous nodes based on a status of the condition. The status of the condition may be determined by subsequent events created by autonomous nodes of the plurality of autonomous nodes encountering the condition after events created by the one or more of the plurality of autonomous nodes. The subsequent events may either validate or invalidate the condition.

The bookmaker module may also be operable to determine the reward based on novelty of the event, where a first event reporting the condition is determined to have a different reward than a second event reporting the condition. The bookmaker module may also be operable to modify the reward and the penalty for the one or more of the plurality of autonomous nodes based at least in part on reputation information for the autonomous nodes of the plurality of autonomous nodes encountering the condition after events created by the one or more of the plurality of autonomous nodes, and to advise an autonomous node of a median stake for a new event. The bookmaker module may determine the median stake based on similar events created by other autonomous nodes.

The trust-less system may further include a trust modulation module that may be configured to modulate a trust level for an event based on a change in a reputation level for at least one of the plurality of autonomous nodes that created the event related to the condition and a total live stake for a plurality events related to the condition. The total live stake may include a value determined by a sum of stakes of events having an active TTL. Stakes for events reporting the condition in an opposite sense from a first report of the condition may be summed as negative values.

The trust-less system may further include a comparator configured to compare a timestamp of a new event with TTLs for events reporting a related condition stored in records in the first ledger, and in response to determining that the timestamp of the new event exceeds the TTLs for events reporting the related condition stored in the first ledger, determine that the events have expired. In response to determining that the events stored in records in the first ledger have not expired, the comparator may be further configured to cause a reward value to be added for the events that are validated by the new event and cause a penalty value to be assessed for the events invalidated by the new event. A record of an event stored in the first ledger may be deleted from the first ledger when the TTL for the event expires.

According to various aspects there is provided a method for sharing event information among autonomous nodes in a trust-less system. In some aspects, the method may include: creating, by a plurality of autonomous nodes, events related to a condition, wherein each event includes event information including an indication of the condition, a stake indicating a degree of confidence that the condition is valid, and a time to live (TTL) for the event; storing a record of each event in a first ledger; storing reputation information for each of the plurality of autonomous nodes in a second ledger; determining, by a bookmaker module, a reward and a penalty for each event created by the plurality of autonomous nodes; and modifying, by the bookmaker module, the reputation information for one or more of the plurality of autonomous nodes based on a status of the condition.

The status of the condition may be determined by subsequent events created by autonomous nodes of the plurality of autonomous nodes encountering the condition after events created by the one or more of the plurality of autonomous nodes. The subsequent events may either validate or invalidate the condition.

The method may further include determining, by the bookmaker module, the reward based on novelty of an event, where a first event reporting the condition is determined to have a higher reward than a second event reporting the condition. The method may further include modifying, by the bookmaker module, the reward and the penalty for the one or more of the plurality of autonomous nodes based at least in part on reputation information for the autonomous nodes of the plurality of autonomous nodes encountering the condition after the events created by the one or more of the plurality of autonomous nodes.

The method may further include modulating, by a trust modulation module, a trust level for an event based on a change in a reputation level for at least one of the plurality of autonomous nodes that created the event related to the condition and a total live stake for a plurality events related to the condition. The total live stake may be a value determined by a sum of stakes of events having an active TTL. Stakes for events reporting the condition in an opposite sense from a first report of the condition may be summed as negative values.

The method may further include comparing, by a comparator, a timestamp of a new event with TTLs for events reporting a related condition stored in records in the first ledger, and in response to determining that the timestamp of the new event exceeds the TTLs for events reporting the related condition stored in the first ledger, determining that the events have expired. In response to determining that the events stored in records in the first ledger have not expired, the method may further include causing a reward value to be added for the events that are validated by the new event and cause a penalty value to be assessed for the events invalidated by the new event.

According to various aspects there is provided a stake-based event system. In some aspects, the stake-based event system may include: a plurality of autonomous nodes operable to create events related to a condition, wherein each event comprises a stake indicating a degree of confidence that the condition is valid, and a time to live (TTL) for the event; a first ledger configured to collect and store a record of each event created by the plurality of autonomous nodes; and a second ledger configured to store reputation information for the plurality of autonomous nodes. An autonomous node may be a sensor, and the sensor may be part of an autonomous vehicle.

Each event may have an associated trust level, each of the plurality of autonomous nodes may establish an individual trust threshold and compare the associated trust level of the event with the individual trust threshold. In response to determining that the associated trust level of the event does not exceed the individual trust threshold, an autonomous node of the plurality of autonomous nodes may not utilize the event. In response to determining that the associated trust level exceeds the individual trust threshold, the autonomous node of the plurality of autonomous nodes may decide whether to utilize the event The stake-based event system may further include: a trust modulation module configured to modulate a trust level for an event based on a change in a reputation level for at least one of the plurality of autonomous nodes that created the event related to the condition and a total live stake for a plurality events related to the condition, where the total live stake may include a value determined by a sum of stakes of events having an active TTL, Stakes for events reporting the condition in an opposite sense from a first report of the condition may be summed as negative values.

Numerous benefits are achieved by way of the various embodiments over conventional techniques. For example, the various embodiments provide an event systems that can enable trust-less information sharing for sensor-based systems. In some embodiments, a pair of ledgers may uniquely track the changes of both event-specific and contributor-specific trust levels to provide trust-less event validation, and rewards/penalties for correct/incorrect event reporting data may be applied. In addition to automated sensor and event reports, other trust-based operations may benefit from the systems and methods of the disclosed embodiments. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which:

FIGS. 2A-2E are diagrams illustrating the operation of an example embodiment of an event system according to various aspects of the present disclosure;

DETAILED DESCRIPTION

Figure 1:
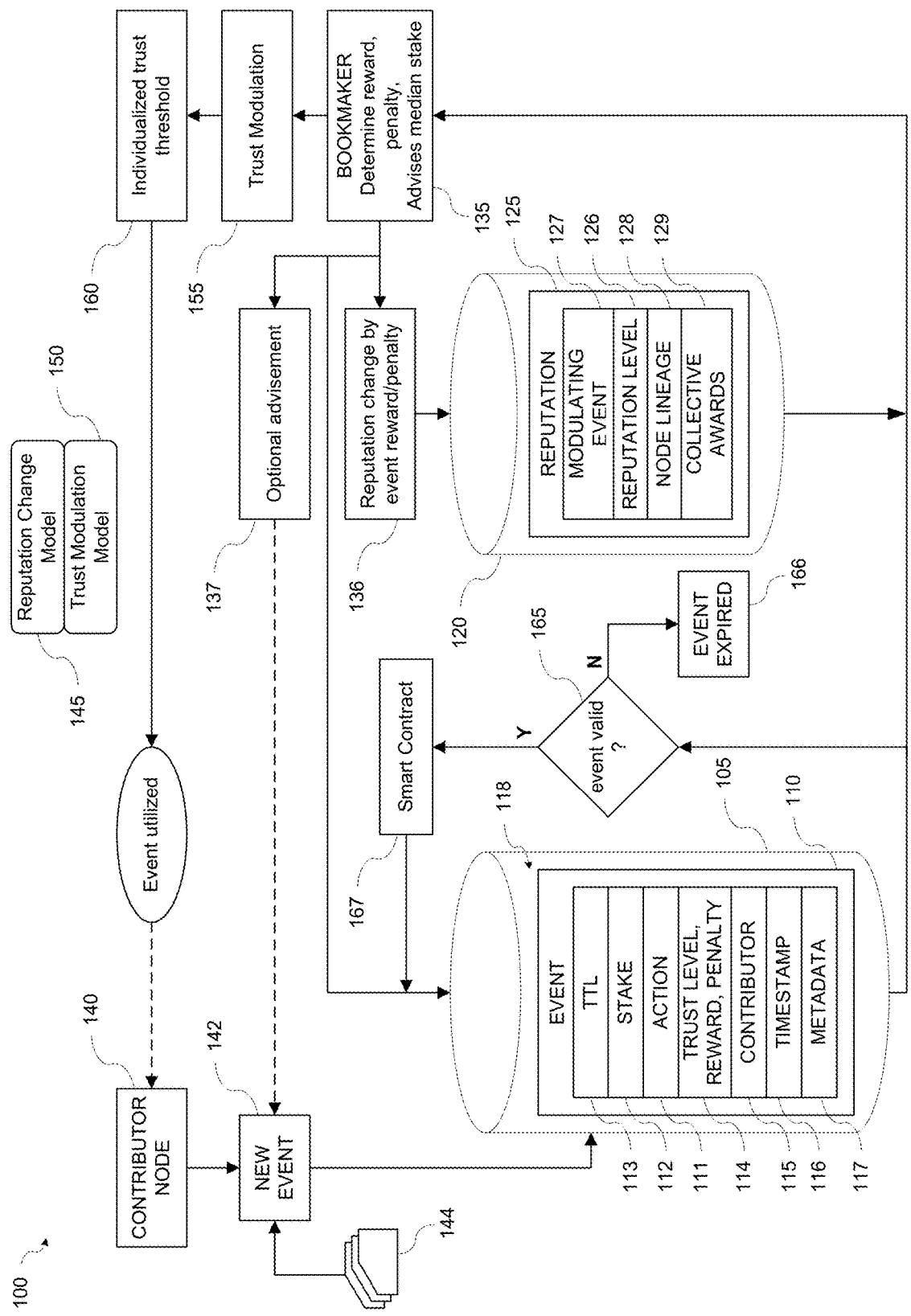
FIG. 1 is a block diagram of an example of an event system according to various aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

In accordance with various aspects of the present disclosure, a trust-less event system utilizing two ledgers, i.e., a ledger for events and a ledger for contributors, with event-based triggers may modulate event trust levels for events created by autonomous nodes. A trust-less system has no central authority to validate transactions on the system; rather, transactions are validated by consensus of participants of the system. Thus, the ability to trust the system does not depend on the intentions of any particular party, which could be an arbitrarily malicious party.

For purposes of explanation and understanding, embodiments are described with respect to autonomous vehicles, each autonomous vehicle having multiple different sensors, where each individual sensor may be a node contributing information (i.e., a contributor node) to the trust-less system. A sensor may detect various conditions, depending on the type of sensor, for example, but not limited to, a pothole, an icy road, etc., and may report the condition to the system as an event. Other sensors may create events related to the condition, either validating or invalidating the condition, and in the process gain rewards or be assessed penalties. Other autonomous sensors may be stationary, for example, but not limited to, cameras mounted on poles or buildings, road sensors, or other sensors not mounted on a vehicle. In some cases, a node may be a device or vehicle associated with a sensor.

Algorithmic methods and an automated, objective bookmaker/advisor module may provide trust level modulation and reward/penalty determination, as well as providing advisements for contributor nodes utilizing the system. To the extent that other nodes in the system validate an event, the contributing node may be rewarded, and to the extent that other nodes in the system invalidate an event, the contributing node may be penalized.

The two ledgers may track the changes of both event-specific and contributor-specific trust levels to provide trust-less event validation. Sensor and event data from various contributor nodes (static, autonomous, etc.) may be integrated such that the format and trust evaluation is normalized across all contributors. The bookmaker module may adapt situationally based on available knowledge and historical performance of ledgers to provide model-based objective computations of rewards/penalties for correct/incorrect event reporting data by contributors. In addition, methods to detect and combat both minor event reporting infractions and major attempts to maliciously inject spurious event reporting data to the system, as well as self-healing methods (i.e., stakes and reputations) for systematically pruning faulty contributors from event data may be employed.

Temporary attacks on the event system by a malicious contributor node are possible, but may be expensive (in terms of a stake provided by the contributor) and easily suppressed by trust-less observations of the same event. Events reported to the event system may naturally expire after a time-to-live value specified by the contributor node or when the amount of a stake specified by the contributor node for the event is depleted. The event system may include bookmaker module that executes one or more algorithms to advise contributors of the importance of their own sensors and events, and objectively evaluate the potential reward and penalty of correct or incorrect event proposals. Sensor-based events from contributors of any trust-level, for example, but not limited to, autonomous vehicles, static input sensors, long-time oracle sensors, etc., may be registered to the system and their inputs weighted to contribute to system knowledge.

In addition, individualized trust thresholds may be incorporated to enable end users (or end systems) to determine the trust threshold needed for event consumption. In accordance with various aspects of the present disclosure, an end-user or end system may compare a trust level of an event to its individualized trust threshold. When the trust level of the event does not exceed the individualized trust threshold, the end-user or end-system may ignore the event. Otherwise, when the trust level of the event exceeds individualized trust threshold for the end-user or end-system, the end-user or end-system may decide whether or not to utilize the event. Alternatively, when the trust level of the event does not exceed the individualized trust threshold, the end-user or end-system may ignore the event, and may decide whether or not to utilize the event when the trust level of the event exceeds individualized trust threshold. Utilizing the event may include, for example, but not limited to, performing a mitigating activity such as slowing down or changing lanes for an autonomous vehicle.

FIG. 1 is a block diagram of an example of a trust-less event system 100 according to various aspects of the present disclosure. As illustrated in FIG. 1, the event system 100 may include a ledger of events 105, a ledger of node reputations 120 and a bookmaker module 135. In accordance with various aspects of the present disclosure, the ledger of events 105 and the ledger of node reputations 120 are write-only, such that a contributor node 140 cannot delete or modify an event once it is created, but the system may modify or delete an event. Contributor nodes 140 may create new events 142 that are stored in the ledger of events 105. In some implementations, new events 142 may be created by other autonomous nodes 144, for example, building or pole mounted cameras, road sensors, or other sensors not mounted on a vehicle. The ledger of events 105 may be a database configured to store records 110 of events 118 containing information related to events created by contributor nodes 140. In some embodiments, events may not be deleted from the ledger of events by the system but may be disregarded by modification of a selection query. For example, events with a time to live (TTL) that has expired may be disregarded by observing nodes and by the bookmaker module 135.

The ledger of events 105 may be a database configured to track events received from contributor nodes 140. An event record 110 of an event 118 may include an action 111, a stake 112, and a time to live (TTL) 113 for the event 118, as well as a timestamp 116 indicating the creation date and time of the event 118. The bookmaker module 135 of the system may assign initial reward, penalty, and trust level values 114 that are stored in the event record 110 of the event 118. The event record 110 may also include a unique identification 115 of the contributor node 140 that created the event. The unique identification 115 may identify an autonomous node, which may be a particular sensor. In some implementations, an event record 110 of an event 118 may also contain metadata 117 related to the event 118, for example, but not limited to, a manufacturer, model number, and brand of sensor, etc.

An action 111 may be, for example, a report of the sensed condition such as a pothole at a certain location (e.g., latitude and longitude, or other map coordinates). A stake 112 may be a value indicating a degree of confidence the contributor node 140 has in the action. The stake 112 may be any form of currency or indicia of value (e.g., cryptocurrency, rewards points, driving record modifications, etc.). The TTL 113 for the event 118 may be a time period, beginning from the timestamp 116, that the contributor node 140 estimates that the event 118 will remain valid. The TTL 113 may be any period of time, for example, four hours, 24 hours, three days, or any other period of time. A record 110 of an event 118 may be deleted from the ledger of events 105 when the TTL 113 of the event 118 expires. The reward, penalty, and trust level values 114 will be explained in further detail in relation to the examples presented below. In some embodiments, events may not be deleted from the ledger of events by the system but may be disregarded by modification of a selection query. For example, events with a TTL that has expired may be ignored by observing nodes and by the bookmaker module 135.

The ledger of node reputations 120 may be a database configured to store reputation records 125 containing information related to the reputation of contributor nodes 140. A reputation record 125 may include a reputation level 126, a modulating event 127, a node lineage 128, and collective awards 129.

The reputation level 126 may be a value, for example, a number of arbitrary reputation points indicating at least in part the trustworthiness of the contributor node 140. The bookmaker module 135 may consider the reputation level 126, at least in part, in determining the reward/penalty for the contributor node 140. A modulating event 127 may be information regarding an event that resulted in a change of the reputation level 126 of the contributor node 140.

The node lineage 128 may include information that identifies a contributor node 140 as a node similar to other nodes that have a particular issue, i.e., reports from the node provide erroneous information, that may render some events created by the contributor node 140 less trustworthy than other events created by the contributor node 140. For example, a particular model of vehicle may have a specific sensor (e.g., a camera or other sensor) that consistently provides faulty information. If the contributor node 140 is that particular model of vehicle having that specific sensor, then the trust level for events that are created involving that specific sensor may be assigned a lower trust level. Conversely, the node lineage 128 may include information that identifies a contributor node 140 as a node similar to other nodes that have provided reliable information, thereby suggesting assignment of a higher trust level.

The collective awards 129 may be a total of points for nodes within a node lineage 128. For example, the collective awards 129 may be a total of points awarded to all vehicles of a same make and model. Total points may be determine by summing over all other records in the ledger of reputations 120, for example by aggregating additions and subtractions over time for values that match the node lineage setting. The collective awards 129 may assist review of particular events. In some implementations, the collective awards 129 may be optional.

The bookmaker module 135 may receive input from the ledger of events 105 and the ledger of reputations 120. In some embodiments, the bookmaker module 135 may receive one or more records from the ledger of events 105. The records may correspond to the same event (e.g., a single pothole with a specified location and time), multiple events (e.g., all potholes over all locations at a given time), multiple observations of the same event (e.g., a pothole with a specified location and various reporting times), or a hybrid thereof (e.g., all potholes and accidents within a location or within a certain reporting time). One of ordinary skill in the art will recognize other variations.

The bookmaker module 135 may compute a recommended stake and reward or penalty based on the frequency of an event or events at a specific location. For example, to combat sparsity in observation reporting, the bookmaker module 135 may compute a high reward. Conversely, to reduce the number of reports the bookmaker module 135 may compute a low reward. In some cases, rewards and suggested stakes may be changed dynamically.

In some embodiments, the bookmaker module 135 may receive one or more records from the ledger of reputations 120. The bookmaker module 135 may compute a recommended stake and reward or penalty based on frequency and density of updates may be applied after processing the incoming records from the ledger of reputations 120. For example, if too many low-reputation records were detected as recent updates in the ledger of reputations 120, the bookmaker module 135 may increase the reward or stake recommendations. In some embodiments, the bookmaker module 135 may use the inputs from the ledger of events 105 and/or the ledger of reputations 120 to create an instantaneous or history-based recommendation to compute the median stake for one or more events.

In some implementations, recommended stakes and rewards or penalties may be computed algorithmically, for example as a moving average, and executed via "smart contracts." The smart contracts may exist as small functional transactions that can use one or more inputs to trigger the creation of a new ledger transaction.

The bookmaker module 135 may compute the rewards and penalties for events created by the contributor nodes 140. In some implementations, the bookmaker module 135 may be a hardware device, for example, but not limited to, a processor or other programmable device, configured to execute an algorithm to compute the rewards and penalties. The rewards and penalties may operate to increase or decrease the reputation level of a contributor node as well as add to or subtract from the stake 112. For example, a sensor reading (i.e., an event) for a contributor node 140 may be found to be authentic (i.e., the event is validated). Based on the validation of the event, the bookmaker module 135 may determine an increased reward for the event 118 and cause the event record 110 of the event 118 stored in the ledger of events 105 to be modified to indicate the increased reward value.

In addition, the bookmaker module 135 may execute a reputation level change operation 136 based on the change in reward value to increase the reputation level 126 for the contributor node 140. The bookmaker module 135 may cause the reputation record 125 for the contributor node 140 stored in the ledger of node reputations 120 to be modified to indicate the new reputation level 126.

In accordance with various aspects of the present disclosure, rewards and penalties may be used to incentivize contributor nodes. For example, when a contributor node creates an event reporting a condition on a sparsely traveled road, the reward may be increased and/or the penalty reduced for subsequent reports to encourage other nodes to travel the road and validate/invalidate the event. As another example, nodes may be incentivized with higher rewards to report traffic conditions during rush hour traffic. As a further example, an owner of a building next to a street may be incentivized to install an autonomous node, for example, a camera, on the building to receive rewards for reporting events occurring on the street.

Similarly, when a sensor reading (i.e., an event) for a contributor node 140 is found not to be authentic, the bookmaker module 135 may determine a decreased reward for the event and cause the event record 110 of the event 118 stored in the ledger of events 105 to be modified to indicate the decreased reward value. The bookmaker module 135 may also execute a reputation level change operation 136 based on the change in reward value to decrease the reputation level 126 for the contributor node 140. The bookmaker module 135 may cause the reputation record 125 for the contributor node 140 stored in the ledger of node reputations 120 to be modified to indicate the decreased reputation level 126.

In some embodiments, the bookmaker module 135 may provide some advisement 137 for a new contributor node entering the system. When creating a new event 142, a new contributor node may not have baseline knowledge about how much trust to place in a sensor for setting a stake 112 compared to similar events for other contributor nodes. The bookmaker module 135 may provide an advisement 137 to the new contributor node regarding a median stake for similar events created by other contributor nodes. The advisement 137 may be based on statistics from both the ledger of events 105 and the ledger of reputations 120. In some implementations, a cost associated with the advisement 137 may be charged to the contributor node to receive the advisement 137 from the bookmaker module 135.

In some embodiments, a reputation change model 145 may determine an amount of change to the reputation level of a contributor node 140. A change to the reputation level of a contributor node may be based at least in part on the number of subsequent events related to a condition by other contributor nodes that validate or invalidate an event reported by the contributor node 140. The reputation change model 145 may also provide input to the bookmaker module 135 to at least in part determine rewards and penalties for a contributor node 140. The reputation change model 145 may be a machine learning model that may determine reputation level change for each contributor node 140 based on the characteristics of the particular contributor node 140.

In some embodiments, a trust modulating model 150 may operate to determine changes in the trust level for a contributor node with regard to an event. The trust level for a contributor node may be determined at least in part by the reputation level 126 for the contributor node 140 and the total live stake for a particular event. The total live stake for an event may be a sum of the stakes, including the stake for the initial event report and the stakes of all subsequent related events, that validate and invalidate the event and have an active TTL 113. The trust modulating model 150 may also consider additional information, for example, but not limited to, the node lineage 128, related to an event in determining whether a trust level for a contributor node should be changed. For example, the trust modulating model 150 may consider whether additional information on an event reported by a contributor node is being received at a high rate and/or whether a large number of other contributor nodes agree with the reported event. One of ordinary skill in the art will appreciate that other indicators may be used without departing from the scope of the disclosure.

The trust modulating model 150 may be a machine learning model that may determine a change in trust level for each contributor node 140 based on learned characteristics of the particular contributor node 140 and or similar contributor nodes. The trust modulating model 150, together with the bookmaker module 135, may provide input to the trust modulating module 155 to at least in part modulate the trust level for a contributor node 140. In addition, the trust modulating model 150 may apply a level of personalization for a particular recipient node. For example, if a recipient node belongs to a vehicle of high civic importance (e.g. a bus, a train, a presidential motorcade) the trust level threshold may be high, meaning that contributor nodes with low trust or a low stake could be ignored. In some cases, learning within the trust modulation model may occur as a result of choices made by an autonomous vehicle or its capabilities. For example, if a vehicle's brakes are worn out or the turning radius is lower than most of its peers, the threshold for trusting reports of potholes or dangerous intersections may be raised or lowered.

In some embodiments, an individual trust threshold 160 may be established by each contributor node. When the trust level of an event does not exceed the individual trust threshold, the contributor node may ignore the event. When the trust level of the event exceeds the individual trust threshold for the contributor node, the contributor node may decide whether or not to utilize the event. Alternatively, when the trust level of the event does not exceed the individualized trust threshold, the contributor node may ignore the event, and may decide whether or not to utilize the event when the trust level of the event exceeds the individual trust threshold for the contributor node. The individual trust threshold 160 may be used by a contributor node to determine whether a reported event should be sufficiently trusted for the contributor node to utilize the event, for example, to perform a mitigating activity. For example, if a particular event, for example, a reported pothole, meets the individual trust threshold 160 for a particular contributor node, the contributor node may slow down to avoid the pothole.

Contributor nodes may have different individual trust thresholds 160. For example, a bus or government vehicle or a receiving node (i.e., a vehicle with no sensing capability) may require a higher individual trust threshold 160 for an event before taking a mitigating action, for example, changing lanes, than other autonomous vehicles. In accordance with various aspects of the present disclosure, a receiving node may communicate with the event system and rely on events tracked by the ledger of events 105 to navigate. An individual trust threshold 160 may be established by a receiving node and may be used to determine whether the receiving node should utilize a particular event.

When a new event 142 is created by a contributor node 140, a record of the new event 142 may be stored in the ledger of events 105. The new event 142, if it is not a first report of a condition, may be compared with other events from other contributor nodes reporting related conditions that are stored in the ledger of events 105. A comparator 165 may determine whether any of the previously reported events are still valid. For example, the comparator 165 may compare the timestamp 116 and TTL 113 of the previous events to the current time. When, based on the comparison, the TTL 113 of a previous event has expired 166, the previous event may be deleted from the ledger of events 105 and no further rewards or penalties accrued to the contributor node for that event. The stake 112 of the expired event may no longer be considered in the total live stake summation. When, based on the comparison, the previous event is still valid, the previous event may earn a reward if the new event validates the previous event or may incur a penalty if the new event invalidates the previous event based on terms of a smart contract 167. For example, events with a time to live (TTL) that has expired may be disregarded by observing nodes and by the bookmaker module 135.

The new event may flow through the event system 100, including the ledger of reputations 120. The reputation change model 145 may at least in part determine a reputation level 126 for the new event. The reputation level 126 may be based on historical data, when it exists, for the contributor node stored in the ledger of reputations 120 as well as input from the reputation change model 145. The bookmaker module 135 may determine a reward and a penalty for the new event. The reward and penalty assigned by the bookmaker module 135 may be based on several factors, for example, but not limited to, the novelty of the event (i.e., whether the event is a first report of a condition or a subsequent validating/invalidating report), the reputation level of the contributing node, etc., as well as the total live stake for the event. One of ordinary skill in the art will appreciate that different and/or additional factors may be used to determine rewards and penalties without departing from the scope of the present disclosure.

The trust modulation model 150 may provide input to the trust modulation module 155 to adjust the trust level based on learned characteristics of the particular contributor node and or similar contributor nodes. The trust level of the event may be compared to an individualized trust threshold 160 established by each contributor node and each contributor node may determine whether to utilize the event.

In some implementations, the ledger of events 105 and/or the ledger of node reputations 120 may be publicly available. In such cases, municipalities may monitor the system as a means of allocating resources, for example, repairing potholes or sanding slippery roads.

FIGS. 2A-2E are diagrams illustrating operation of an example embodiment of an event system according to aspects of the present disclosure. In FIGS. 2A-2E, the contributor nodes may be autonomous vehicles; however, embodiments in accordance with the present disclosure are not limited to this implementation. One of ordinary skill in the art will appreciate that other sensor-based systems and apparatuses, for example, but not limited to, air traffic control, railway systems, etc., whether stationary or mobile or combinations thereof, may employ the systems and methods disclosed herein.

Referring to FIG. 2A, a first contributor node, i.e., Car A, may create a first event 210a. The event may be based on a reading from a sensor of Car A that detects a pothole in the road (i.e., a condition). The first event 210a created by Car A may include a report of the condition 211 sensed by one or more of the sensors on Car A, for example, a pothole at a certain location (e.g., latitude and longitude, or other map coordinates), a stake 212 (i.e., $10), and a TTL 213 (24 hours) for the event, as well as a timestamp 214 indicating the creation date and time of the event. The TTL 213 may be an estimation by Car A of a time frame during which the condition will persist (i.e., the pothole will not be fixed).

The bookmaker module 135 of the system may assign a reward value 215 of 0.7% of the stake and a penalty value 216 of 0.2% of the stake to the first event 210, as well as a reputation points value 217a (2000 reputation points). The reputation points value 217a may be retrieved from the leger of node reputations 120 or may be otherwise assigned by the bookmaker module 135. The first event 210a may be entered as a record 110 in the ledger of events 105. The reward value and the penalty value may be determined based on a plurality of factors including, but not limited to, the reputation level of the contributing node, the TTL of the event, the type of sensor reporting the event, the area in which the event occurred, etc. One of ordinary skill in the art will appreciate that other factors may be considered in determining the reward value in the penalty value without departing from the scope of the present disclosure.

Throughout the examples herein, the term "reputation points" will be used to express a reputation value of a contributor node, and a monetary value, for example dollars, will be used to express a value for a stake. One of ordinary skill in the art will appreciate that the reputation points referred to in the examples are arbitrary units representing arbitrary values and that other units and or values for expressing a reputation value of a contributor may be used without departing from the scope of the present disclosure. Further, one of ordinary skill in the art will appreciate that the indication of a monetary value for a stake as used in the examples is arbitrary and that any form of currency or indicia of value (e.g., crypto-currency, rewards points, driving record modifications, etc.) for expressing a stake value of a contributor node may be used without departing from the scope of the present disclosure.

Referring to FIG. 2B, a second contributor node, i.e., Car B, may come upon the location of the condition, i.e., the pothole in the road, may receive the event information from the trust-less event system reported by the first event 210a created by Car A. For example, the event information may be transmitted by the trust-less event system to Car B when Car B enters a geo-fenced area around a reported condition, where the fenced area is monitored by the trust-less event system. One of ordinary skill in the art will appreciate that other methods of causing event information to be received from the trust-less event system without departing from the scope of the present disclosure.

Car B may create a second event 220a. The event may be based on a reading from a sensor of Car B that detects the pothole in the road. The second event 220a created by Car B may include a report of the condition 221 sensed by one or more of the sensors on Car B, a stake 222 ($10), and a TTL 223 (24 hours) for the event, as well as a timestamp 224 indicating the creation date and time of the event. The reward and penalty information from Car A may be used, at least in part, by Car B to determine an amount to stake. The second event 220a created by Car B may validate the first event 210a created by Car A. As a result, the reputation level 217b of Car A indicated in event 210b may increase as shown in FIG. 2B.

Because Car B came upon the condition reasonably close in time (three hours) to the time Car A came upon the condition, Car B may also set a TTL 223 of 24 hours for the second event 220a. The bookmaker module 135 of the system may assign a reward value 225 (0.35%) and a penalty value 226 (0.1%) to the event, as well as a reputation points value 217a (2000 reputation points). The reputation points value 217a may be retrieved from the leger of node reputations 120 or may be otherwise assigned by the bookmaker module 135. The second event 220a may be entered as a record in the ledger of events 105. Car B may determine to trust that there is a pothole in the road reported by the first event 210a based on the stake 212 and the reputation level 217a of Car A and may perform a mitigation activity 228, for example, slowing down to avoid the pothole, or another activity.

In FIG. 2B, Car B has the same reputation points value 227a (i.e., 2000 reputation points) as the reputation points value Car A had when Car A created the first event 210a. However, the reward 225 determined by the bookmaker module 135 for the second event 220a is only 0.35% of the stake 222 and the penalty 226 for Car B is decreased in proportion to 0.1%, i.e., the reward to penalty ratio equal for both Car A and Car B since their reputation levels are the same.

Since Car A and Car B had the same reputation points value, the lower reward for Car B may be primarily based on the novelty of the event, i.e., the second event 220a reported by Car B is not the first report of the condition, therefore, the novelty and the corresponding reward may be lower. It should also be noted that since the first event 210a reported by Car A was validated by the second event 220a reported by Car B, the reputation level 217b of Car A indicated in event 210b may increase from 2000 reputation points to 2010 reputation points as shown in FIG. 2B. In addition, Car A may earn a reward of $0.07 due to the validation of the first event.

Figure 2C:
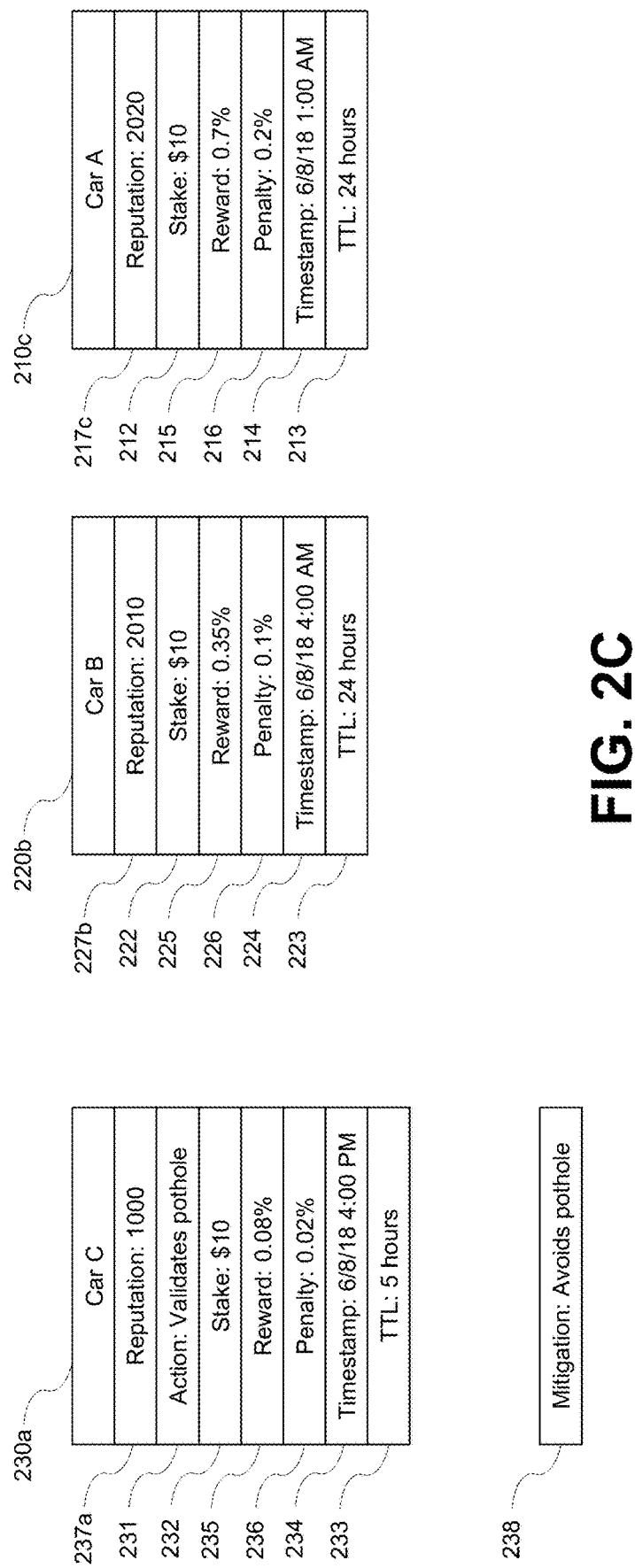

Referring to FIG. 2C, a third contributor node, i.e., Car C, may receive information of the second event 220a reported by Car B as it comes upon the location of the pothole in the road. The pothole may have been reported by the first event 210b created by Car A and the second event 220a created by Car B. Car C may have a lower reputation level 237a than Car A and Car B; therefore, the bookmaker module 135 may consider the lower reputation level 237a and that the report is a third report related to the condition (i.e., the pothole) and assign a lower reward value 235 but also a lower penalty value 236. Car C may create a third event 230a and put up a stake 232 of $10 on the event. The third event 230a created by Car C may validate 231 the first event 210b created by Car A and the second event 220a created by Car B. Accordingly, the reputation level 217c of Car A indicated in event 210c and the reputation level 227b of Car B indicated in event 220b may increase as shown in FIG. 2C, and Car A may earn a reward 215 of $0.07 for a total of $0.14, while Car B may earn a reward 225 of $0.035.

Since Car C came upon the pothole much later in time than Car A and Car B, Car C may set a TTL 233 for the third event of only five hours. Car C may have a lower reputation level 237a (i.e., 1000 reputation points) than Car A and Car B. Based at least in part on the lower reputation level, the relatively short TTL of the event, and that the third event 230a is the third report of the related condition, the bookmaker module 135 may assign a lower reward value 235 (0.08% of the stake) and also a lower penalty value 236 (0.02% of the stake) to the third event 230a. The third event 230a may be entered as a record in the ledger of events 105.

Car C may determine to trust that there is a pothole in the road reported by the first event 210 and the second event 220 based on the total live stake of $20 and the reputation levels of Car A and Car B. The total live stake may be the sum of the individual stakes from the first event 210 and the second event 220 since the TTLs of the events are active (i.e., based on the timestamp 234 Car C came upon the location of the condition within the 24 hour TTL of both the first event 210 and the second event 220). Accordingly, Car C may perform a mitigation activity 238, for example, slowing down to avoid the pothole or some other activity.

Figure 2D:
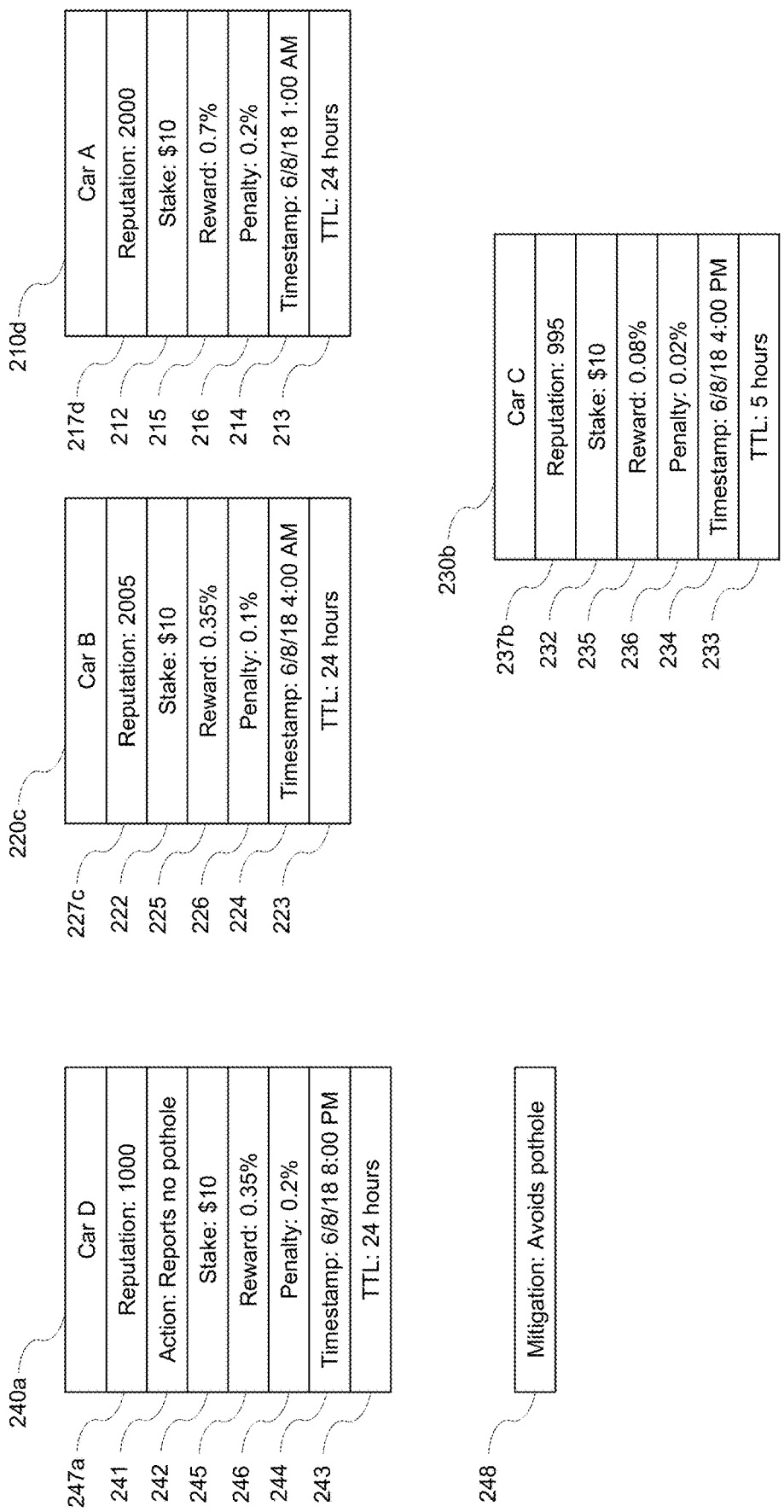

Referring to FIG. 2D, the condition may have been resolved (i.e., the pothole may have been fixed). When a fourth contributor node (i.e., Car D) comes upon the location of the condition and receives the event information from the third event 230a, Car D may sense that there is no pothole in the road. Car D may create a fourth event 240a that reports no pothole and invalidates the first event 210c, the second event 220b, and the third event 230a. Car D may put up a stake 242 of $10 on the fourth event 240a with a TTL 243 of 24 hours. Car D may also have a lower reputation level 247a than Car A and Car B; therefore, the bookmaker module 135 may consider the lower reputation level 247a, even though the fourth event 240a reports a different related condition (i.e., no pothole where previous events indicated that a pothole existed), and assign a lower reward value 245. The fourth event 240a may be entered as a record in the ledger of events 105.

Although Car D may report 241 that no pothole is present at the previously reported location, having received the event information for the third event 230b, Car D may determine to trust that there is a pothole in the road as reported by the first event 210d, the second event 220c, and the third event 230b based on the total live stake of $30 and the reputation level 217c of Car A indicated in event 210c, the reputation level 227b of Car B indicated in event 220b, and the reputation level 237b of Car C indicated in event 230b as shown in FIG. 2D. The total live stake may be the sum of the individual stakes from the first event 210d, the second event 220c, and the third event 230b since the TTLs of the events are active (i.e., based on the timestamp 244 Car D came upon the location of the condition within the 24 hour TTL of both the first event 210d and the second event 220c as well as the five hour TTL 233 of the third event 230b). Accordingly, Car D may perform a mitigation activity 248, for example, slowing down to avoid the pothole, or some other activity.

As a result of the invalidating fourth event 240a, the reputation level 217d of Car A indicated in event 210d, the reputation level 227c of Car B indicated in event 220d, and the reputation level 237b of Car C indicated in event 230d may decrease as shown in FIG. 2D and a penalty may be assessed to each of them. For example, the total reward for Car A may be reduced from $0.14 to $0.12, the total reward for Car B may be reduced from $0.035 to $0.025, and Car C may be assessed a penalty 246 of $0.002.

Figure 2E:
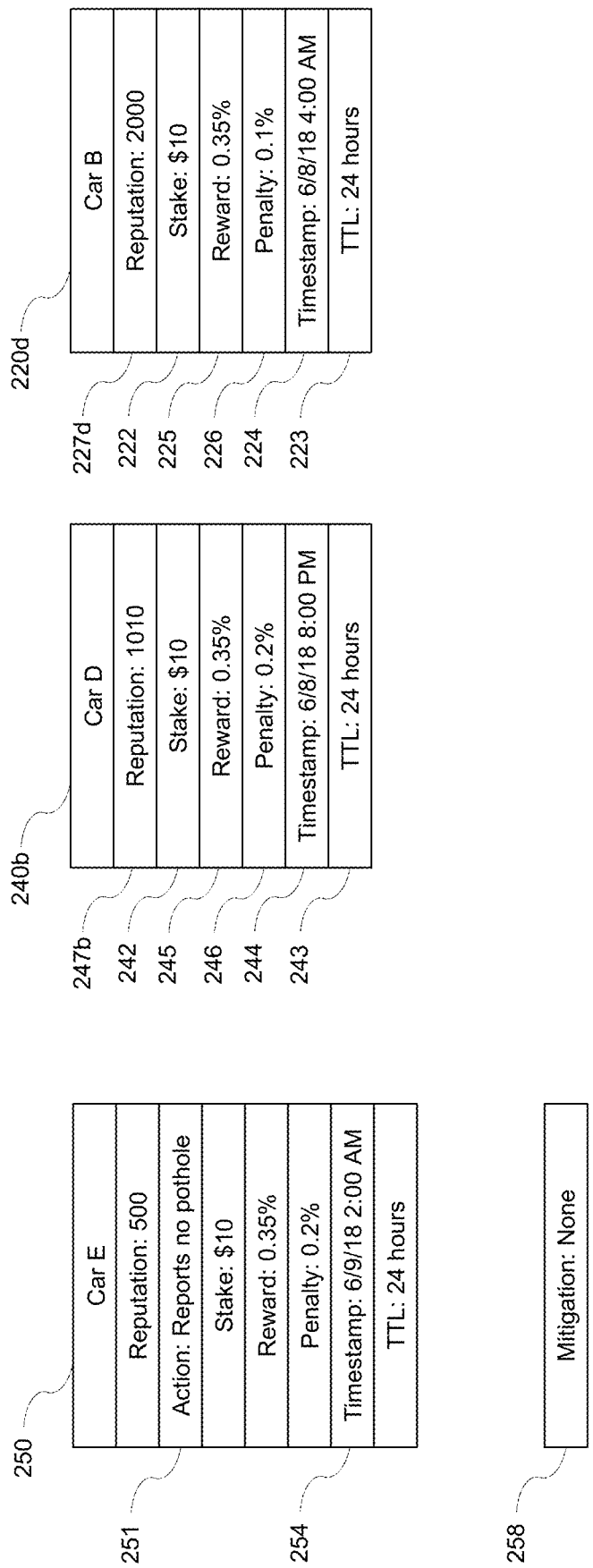

Referring to FIG. 2E, a fifth contributor node (i.e., Car E) comes upon the location of the condition after the pothole has been fixed and may receive the event information from the fourth event 240a. Car E may sense that there is no pothole in the road. In this case, however, based on its timestamp 254, Car E comes upon the location of the condition after the TTL 213 (24 hours) for the first event 210d and the TTL 233 (five hours) for the third event 230b have expired. Therefore, neither the first event 210d nor the third event 230b are considered by Car E. Based on the timestamp 244 and TTL 243 for the fourth event 240a and the timestamp 224 and TTL 223 of the second event 220c, only those two events are still alive. Car E may create a fifth event 250 that reports 251 no pothole, thereby invalidating the second event 220c and validating the fourth event 240b.

Car E may determine to trust that no pothole is present in the road as reported by the fourth event 240 based on the total live stake of $0 and the reputation level 247 of Car D. The total live stake may be the sum of the individual stakes from the second event 220 and the fourth event 240 since the TTLs of the events are active (i.e., based on the timestamp 254 Car E came upon the location of the condition within the 24 hour TTL of both the second event 220 and the fourth event 240). In this case, the total live stake is the $10 stake 242 from the validated fourth event 240 from which the $10 stake 222 of the invalidated second event 220 is subtracted. The stake 222 of the second event 220 is subtracted because the second event 220 has been invalidated. Accordingly, Car E may not perform a mitigation activity 258, for example, slowing down to avoid the pothole.

As a result of the invalidating fifth event 250, the reputation level 227 of Car B may decrease further and a penalty of $0.01 may be assessed to Car B by reducing its total reward. On the other hand, since the fifth event 250 validates the fourth event 240, Car D may receive a reward 245 of 0.35% of its stake 242 and its reputation level 247 may increase.

Figure 3A:
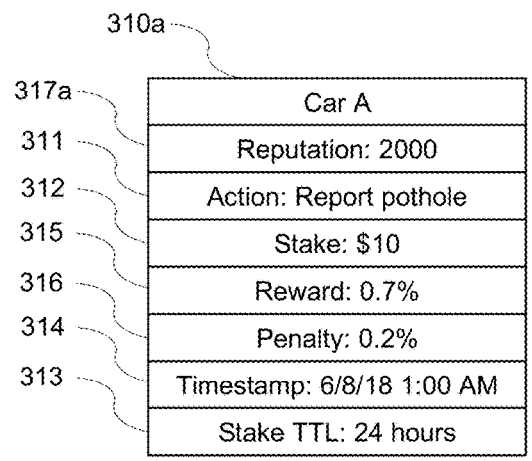
FIGS. 3A-3C are diagrams illustrating operation of an example embodiment of an event system in the presence of a malicious actor according to various aspects of the present disclosure.
Figure 3B:
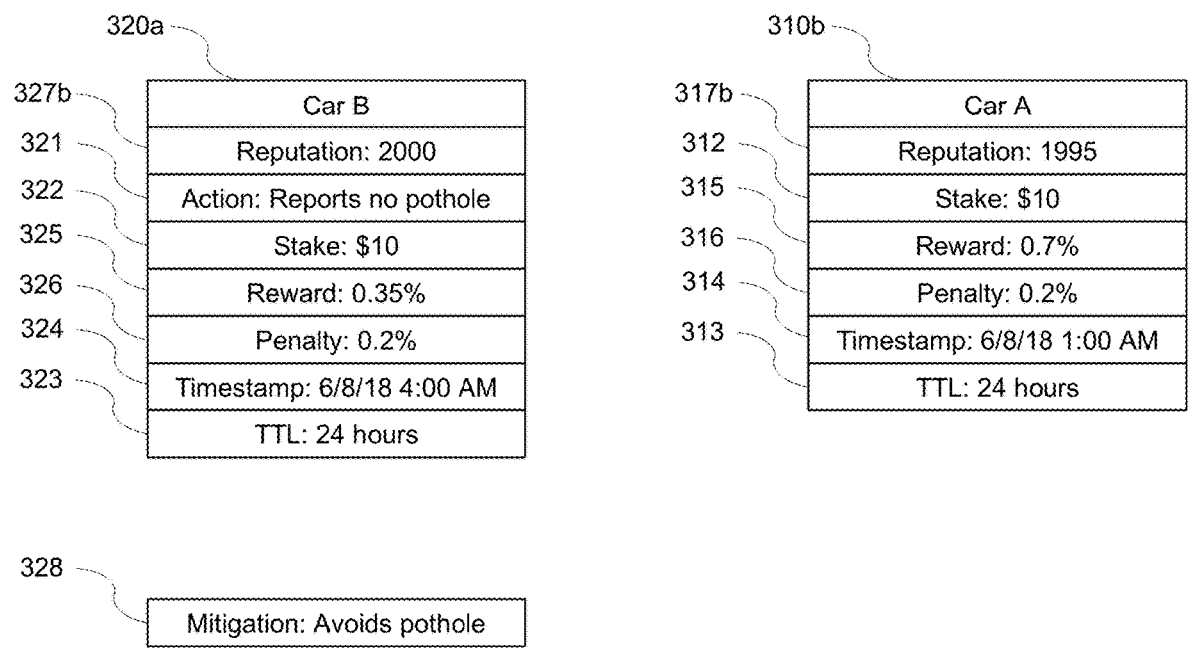
Figure 3C:
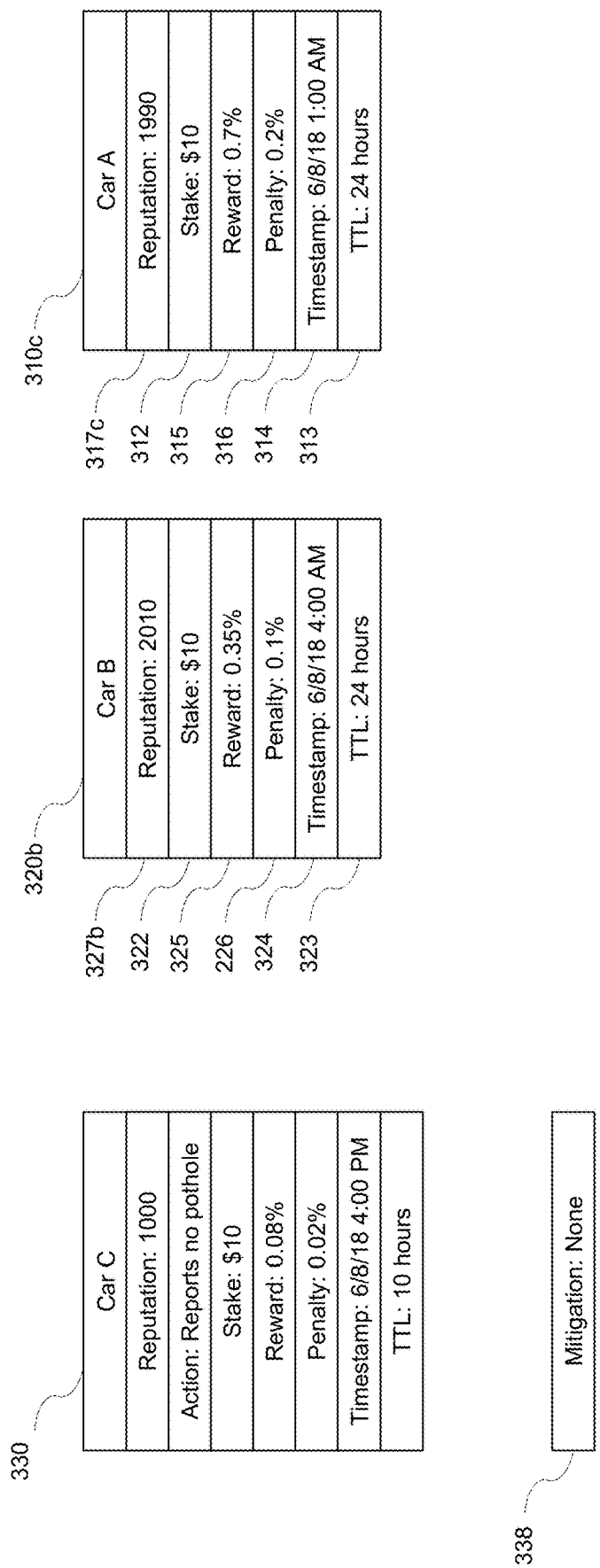

FIGS. 3A-3C are diagrams illustrating operation of an example embodiment of an event system in the presence of a malicious actor according to aspects of the present disclosure. In some cases, a malicious actor may be in intentional actor, for example, a hacker inserting additional program code to cause a node to provide faulty reports. In other cases, a malicious actor may be an unintentional actor, for example, a mechanical or electrical defect that causes issues where sensor may steadily or intermittently report nonexistent conditions because of the defect.

Referring to FIG. 3A, a first contributor node, i.e., Car A, may be a malicious node that may create a first event 310a. The event may be a fictitious report of a nonexistent pothole in the road (i.e., a condition). The first event 310a created by Car A may include the fictitious report of the nonexistent condition 311, for example a pothole at a certain location (e.g., latitude and longitude, or other map coordinates)), a stake 312 (i.e., $10), and a TTL 313 (24 hours) for the event, as well as a timestamp 314 indicating the creation date and time of the event. The TTL 313 may be a time frame during which Car A wants the nonexistent condition to exist.

The bookmaker module 135 of the system may assign a reward value of 0.7% 315 of the stake and a penalty value of 0.2% 316 of the stake to the first event 310, as well as a reputation points value (2000 reputation points) 317a. The reputation points value 317a may be retrieved from the leger of node reputations 120 or may be otherwise assigned by the bookmaker module 135. The first event 310a may be entered as a record 110 in the ledger of events 105. The reward value and the penalty value may be determined based on a plurality of factors including, but not limited to, the reputation level of the contributing node, the TTL of the event, the type of sensor reporting the event, the area in which the event occurred, etc. One of ordinary skill in the art will appreciate that other factors may be considered in determining the reward value in the penalty value without departing from the scope of the present disclosure.

Referring to FIG. 3B, a second contributor node, i.e., Car B, may come upon the location of the nonexistent condition, i.e., the nonexistent pothole in the road, reported by the first event 310a created by the malicious actor Car A and may create a second event 320a. The bookmaker module 135 may determine a reward 325 (i.e., 0.35% of the stake) and a penalty 326 (i.e., 0.2% of the stake) for the second event 320a. The second event 320a created by Car B may invalidate the first event 210a created by Car A. The event may be based on a reading from a sensor of Car B that detects that there is no pothole in the road. The second event 320a created by Car B may include a report of the condition 321 sensed by one or more of the sensors on Car B, a stake 322 ($10), and a TTL 323 (24 hours) for the event, as well as a timestamp 324 indicating the creation date and time of the event. The second event 320a may be entered as a record in the ledger of events 105.

Although Car B may report that no pothole is present at the location of the previously reported first event 310a, Car B may determine to trust that there is a pothole in the road reported by the first event 310a based on the live stake of $10 from the first event 310a and the reputation level 317a of Car A. Since the TTL 313 of the first event 310a is active (i.e., based on the timestamp 324 Car B came upon the location of the condition within the 24 hour TTL 313 of the first event 310a, Car B may perform a mitigation activity 328, for example, slowing down to avoid the pothole, or another activity. As a result of the invalidating second event 320a, the reputation level 317b of Car A indicated in the event 310b may decrease as shown in FIG. 3B and a penalty of $0.02 may be assessed to Car A.

Referring to FIG. 3C, a third contributor node (i.e., Car C) may come upon the location of the nonexistent condition (i.e., no pothole in the road) and having received the information from the second event 320a may sense that there is no pothole in the road. Car C may create a third event 330 that invalidates the first event 310b and validates the second event 320a. Car C may determine to trust that no pothole is present in the road as reported by the second event 320a based on the total live stake of $0 and the reputation level of Car B.

The total live stake may be the sum of the individual stakes from the first event 310b and the second event 320a since the TTLs of the events are active (i.e., based on the timestamp 334 Car C came upon the location of the condition within the 24 hour TTL of both the first event 310b and the second event 320a). In this case, the total live stake is the $10 stake 322 from the validated second event 320a from which the $10 stake 312 of the invalidated first event 310b is subtracted. The stake 312 of the first event 310b is subtracted because the first event 310b has been invalidated. Accordingly, Car C may not perform a mitigation activity 338, for example, slowing down to avoid the pothole, or other activity.

As a result of the invalidating third event 330, the reputation level 317c of Car A may decrease further as indicated in the event 310c shown in FIG. 3C and an additional penalty of $0.02 may be assessed to Car A. On the other hand, since the third event 330 validates the second event 320a, Car B may receive a reward 325 of 0.35% of its stake 322 and its reputation level 327b may increase as indicated in the event 320b shown in FIG. 3C.

One of ordinary skill in the art will appreciate that the values for reputation points, stakes, rewards, penalties, and TTLs used in the examples are merely for purposes of illustration and explanation and that other values may be used without departing from the scope of the present disclosure.

In some implementations, subsequent contributor nodes may stop reporting a condition that invalidates a previous event after a first event reporting that the condition has been resolved. Alternatively, subsequent contributor nodes that continue to report a resolved condition may be penalized. In some implementations, an event having a TTL but no remaining reputation level (i.e., because of subsequent events that invalidates the event) may be deleted from the ledger of events. In some embodiments, events may not be deleted from the ledger of events by the system but may be disregarded by modification of a selection query. For example, events with a time to live (TTL) that has expired may be disregarded by observing nodes and by the bookmaker module 135.

In some cases, multiple contributor nodes (i.e., sensors) may detect multiple conditions at a particular location and/or time. The multiple contributor nodes may be, for example, sensors disposed in the same autonomous vehicle. In some implementations, a contributor node may execute an algorithm, for example, but not limited to a machine learning algorithm, to determine which event or events to report based on their potential impact on other autonomous nodes.

Figure 4:
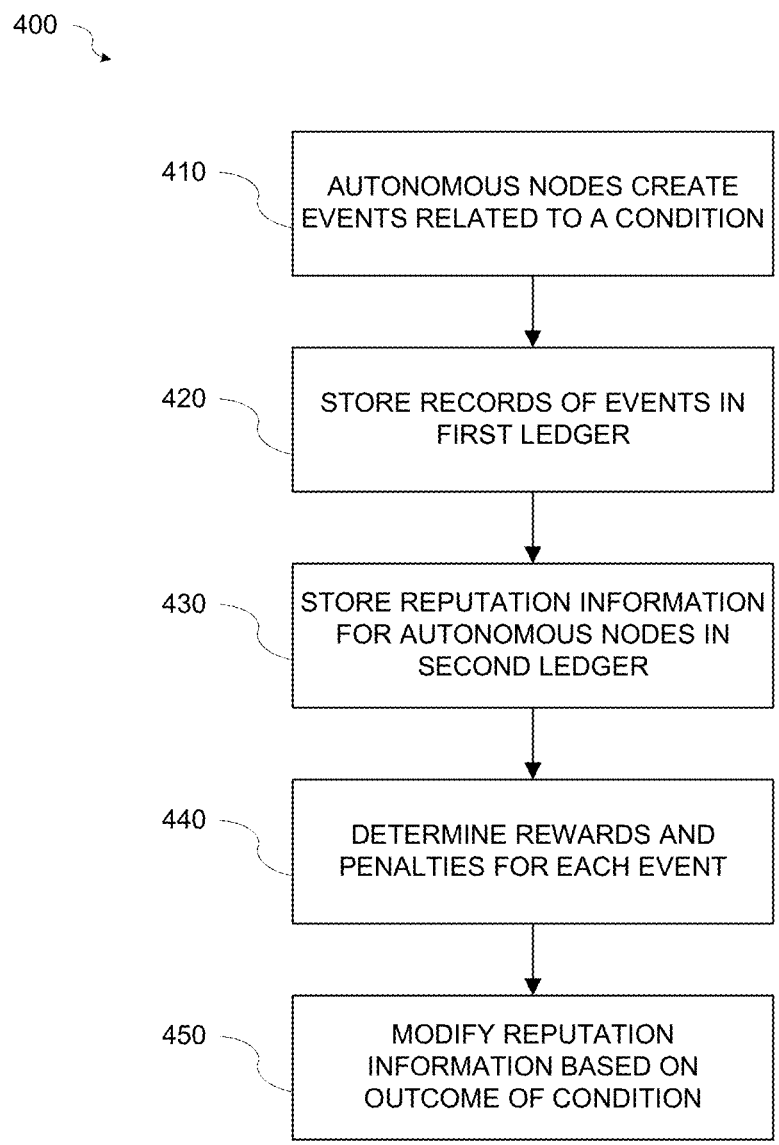
FIG. 4 is a flowchart illustrating a method for sharing event information among autonomous nodes in a trust-less system according to various aspects of the present disclosure.

FIG. 4 is a flowchart illustrating a method 400 for sharing event information among autonomous nodes in a trust-less system according to various aspects of the present disclosure. Referring to FIG. 4, at block 410, a plurality of autonomous nodes may create events related to a condition. A condition may be, for example, but not limited to, sensed condition such as a pothole at a certain location (e.g., latitude and longitude, or other map coordinates). Each event may include event information including, but not limited to, an indication of the condition, a stake indicating a degree of confidence that the condition is valid, and a time to live (TTL) for the event. The stake may be a value indicating a degree of confidence the contributor node 140 has in the action. The stake may be any form of currency or indicia of value (e.g., crypto-currency, rewards points, driving record modifications, etc.). The TTL for the event may be a time period, beginning from the timestamp, that the contributor node estimates that the event will remain valid. The TTL may be any period of time, for example, four hours, 24 hours, three days, or any other period of time.

At block 420, a record of each event may be stored in a first ledger. The first ledger may be a database configured to store records of events. The ledger of events may track events received from the plurality of autonomous nodes. A record of an event may be deleted from the ledger of events when the TTL is no longer active. At block 430, reputation information for each of the plurality of autonomous nodes may be stored in a second ledger. The second ledger may be a ledger of node reputations. The ledger of node reputations may be a database configured to store reputation records containing information related to the reputation of each of the plurality of autonomous nodes. In some embodiments, events may not be deleted from the ledger of events by the system but may be disregarded by modification of a selection query. For example, events with a time to live (TTL) that has expired may be disregarded by observing nodes and by the bookmaker module 135.

At block 440, a reward and a penalty for each event may be determined. A bookmaker module may compute the rewards and penalties for events created by the plurality of autonomous nodes. In some implementations, the bookmaker module may be a hardware device, for example, but not limited to, a processor or other programmable device, configured to execute an algorithm to compute the rewards and penalties. The rewards and penalties may operate to increase or decrease the reputation level of an autonomous node as well as add to or subtract from the stake.

At block 450, reputation information for one or more of the plurality of autonomous nodes may be modified. The bookmaker module may execute a reputation level change operation based on the change in reward value to increase the reputation level for an autonomous node. The bookmaker module may cause the reputation record for the contributor node stored in the ledger of node reputations to be modified to indicate the new reputation level. Modifications of the reputation level, as well as the penalties and rewards, may be based on the status of the condition, i.e., whether the condition exists or no longer exists, reported by the events. The reputation level of the autonomous node may be considered by a trust modulation module to determine, at least in part, a trust level for the event that can be used by other autonomous nodes to determine whether to utilize the event.

The status of the condition, i.e., whether the condition exists or no longer exists, may be determined by subsequent events created by autonomous nodes of the plurality of autonomous nodes encountering the condition after events created by the one or more of the plurality of autonomous nodes, wherein the subsequent events either validate or invalidate the condition.

It should be appreciated that the specific steps illustrated in FIG. 4 provide a particular method for utilizing stake-based events in an event system according to an embodiment of the present disclosure. Other sequences of steps may also be performed according to alternative embodiments. For example, alternative embodiments of the present invention may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. One of ordinary skill in the art would recognize many variations, modifications, and alternatives.

The various illustrative logical blocks, modules, and algorithm operations described in connection with the embodiments disclosed herein may be implemented as electronic hardware, computer software, or combinations of both. To clearly illustrate this interchangeability of hardware and software, various illustrative components, blocks, modules, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the various embodiments.

The hardware used to implement the various illustrative logic, logical blocks, and modules described in connection with the aspects disclosed herein may be implemented or performed with a computer system, a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. Alternatively, some operations or methods may be performed by circuitry that is specific to a given function.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A trust-less system for sharing event information among autonomous nodes, the trust-less system comprising:
   a plurality of autonomous nodes, wherein each of the plurality of autonomous nodes creates an event related to a condition, wherein the event comprises event information including an indication of the condition, a stake indicating a degree of confidence that the condition is valid, and a time to live (TTL) for the event;
   a first ledger configured to collect and store a record of each event created by the plurality of autonomous nodes;
   a second ledger configured to store reputation information for the plurality of autonomous nodes; and
   a bookmaker module operable to determine a reward and a penalty for each event created by the plurality of autonomous nodes,
   wherein the bookmaker module is operable to modify the reputation information for one or more of the plurality of autonomous nodes based on a status of the condition, wherein the status of the condition is determined by subsequent events created by autonomous nodes of the plurality of autonomous nodes encountering the condition after events created by the one or more of the plurality of autonomous nodes, wherein the subsequent events either validate or invalidate the condition.

2. The trust-less system of claim 1, wherein the bookmaker module is further operable to determine the reward based on novelty of the event, wherein a first event reporting the condition is determined to have a different reward than a second event reporting the condition.

3. The trust-less system of claim 1, wherein the bookmaker module is further operable to modify the reward and the penalty for the one or more of the plurality of autonomous nodes based at least in part on reputation information for the autonomous nodes of the plurality of autonomous nodes encountering the condition after events created by the one or more of the plurality of autonomous nodes.

4. The trust-less system of claim 1, wherein the bookmaker module is further operable to advise an autonomous node of a median stake for a new event,
   wherein the bookmaker module determines the median stake based on similar events created by other autonomous nodes.

5. The trust-less system of claim 1, further comprising a trust modulation module,
   wherein the trust modulation module is configured to modulate a trust level for an event based on a change in a reputation level for at least one of the plurality of autonomous nodes that created the event related to the condition and a total live stake for a plurality events related to the condition.

6. The trust-less system of claim 5, wherein the total live stake comprises a value determined by a sum of stakes of events having an active TTL,
   wherein stakes for events reporting the condition in an opposite sense from a first report of the condition are summed as negative values.

7. The trust-less system of claim 1, further comprising a comparator,
   wherein the comparator is configured to compare a timestamp of a new event with TTLs for events reporting a related condition stored in records in the first ledger, and in response to determining that the timestamp of the new event exceeds the TTLs for events reporting the related condition stored in the first ledger, determine that the events have expired.

8. The trust-less system of claim 7, wherein in response to determining that the events stored in records in the first ledger have not expired, the comparator is further configured to cause a reward value to be added for the events that are validated by the new event and cause a penalty value to be assessed for the events invalidated by the new event.

9. The trust-less system of claim 1, wherein a record of an event stored in the first ledger is deleted from the first ledger when the TTL for the event expires.

10. The trust-less system of claim 1, wherein an autonomous node comprises a sensor, and
wherein the sensor comprises an autonomous vehicle.

11. A method for sharing event information among autonomous nodes in a trust-less system, the method comprising:
creating, by a plurality of autonomous nodes, events related to a condition, wherein each event comprises event information including an indication of the condition, a stake indicating a degree of confidence that the condition is valid, and a time to live (TTL) for the event;
storing a record of each event in a first ledger;
storing reputation information for each of the plurality of autonomous nodes in a second ledger;
determining, by a bookmaker module, a reward and a penalty for each event created by the plurality of autonomous nodes; and
modifying, by the bookmaker module, the reputation information for one or more of the plurality of autonomous nodes based on a status of the condition,
wherein the status of the condition is determined by subsequent events created by autonomous nodes of the plurality of autonomous nodes encountering the condition after events created by the one or more of the plurality of autonomous nodes, wherein the subsequent events either validate or invalidate the condition.

12. The method of claim 11, further comprising:
determining, by the bookmaker module, the reward based on novelty of an event, wherein a first event reporting the condition is determined to have a higher reward than a second event reporting the condition.

13. The method of claim 11, further comprising:
modifying, by the bookmaker module, the reward and the penalty for the one or more of the plurality of autonomous nodes based at least in part on reputation information for the autonomous nodes of the plurality of autonomous nodes encountering the condition after the events created by the one or more of the plurality of autonomous nodes.

14. The method of claim 11, further comprising:
modulating, by a trust modulation module, a trust level for an event based on a change in a reputation level for at least one of the plurality of autonomous nodes that created the event related to the condition and a total live stake for a plurality events related to the condition,
wherein the total live stake comprises a value determined by a sum of stakes of events having an active TTL,
wherein stakes for events reporting the condition in an opposite sense from a first report of the condition are summed as negative values.

15. The method of claim 11, further comprising:
comparing, by a comparator, a timestamp of a new event with TTLs for events reporting a related condition stored in records in the first ledger, and
in response to determining that the timestamp of the new event exceeds the TTLs for events reporting the related condition stored in the first ledger, determining that the events have expired.

16. The method of claim 15, further comprising:
in response to determining that the events stored in records in the first ledger have not expired, causing a reward value to be added for the events that are validated by the new event and cause a penalty value to be assessed for the events invalidated by the new event.

17. A stake-based event system, comprising:
a plurality of autonomous nodes operable to create events related to a condition, wherein each event comprises a stake indicating a degree of confidence that the condition is valid, and a time to live (TTL) for the event;
a first ledger configured to collect and store a record of each event created by the plurality of autonomous nodes; and
a second ledger configured to store reputation information for the plurality of autonomous nodes,
wherein each event has an associated trust level,
each of the plurality of autonomous nodes establishes an individual trust threshold and compares the associated trust level of the event with the individual trust threshold, and
in response to determining that the associated trust level of the event does not exceed the individual trust threshold, an autonomous node of the plurality of autonomous nodes does not utilize the event.

18. The stake-based event system of claim 17, wherein in response to determining that the associated trust level exceeds the individual trust threshold, the autonomous node of the plurality of autonomous nodes decides whether to utilize the event.

19. The stake-based event system of claim 17, further comprising a trust modulation module configured to modulate a trust level for an event based on a change in a reputation level for at least one of the plurality of autonomous nodes that created the event related to the condition and a total live stake for a plurality events related to the condition,
wherein the total live stake comprises a value determined by a sum of stakes of events having an active TTL,
wherein stakes for events reporting the condition in an opposite sense from a first report of the condition are summed as negative values.

20. The stake-based event system of claim 17, wherein an autonomous node comprises a sensor, and
wherein the sensor comprises an autonomous vehicle.

* * * * *